United States Patent [19]

Borer et al.

[11] 4,162,283

[45] Jul. 24, 1979

[54] METHOD OF MELTING MAGNETICALLY WEAK PARTICLES OF ARBITRARY SHAPE INTO SUBSTANTIALLY SPHERICALLY-SHAPED GLOBULES

[75] Inventors: Werner J. Borer, Flurlingen; Tibor Kugler, Thayngen; Tomas Zuzak, Feuerthalen, all of Switzerland

[73] Assignee: Swiss Aluminium Ltd., Chippis, Switzerland

[21] Appl. No.: 871,951

[22] Filed: Jan. 24, 1978

[30] Foreign Application Priority Data

Dec. 8, 1977 [CH] Switzerland ........................ 15045/77

[51] Int. Cl.² .............................................. B29C 23/00

[52] U.S. Cl. ...................................... 264/15; 425/404; 425/445

[58] Field of Search .................... 264/15, 10, 8; 425/6, 425/7, 8, 445, 404

[56] References Cited

U.S. PATENT DOCUMENTS

| | | | |
|---|---|---|---|
| 3,645,894 | 2/1972 | Krystyniak | 264/15 |
| 3,665,244 | 5/1972 | Kugler | 315/111.2 |
| 3,712,996 | 1/1973 | Kugler | 313/231.5 |
| 3,943,211 | 3/1976 | Dickey | 264/15 |

*Primary Examiner*—Robert F. White
*Assistant Examiner*—James R. Hall
*Attorney, Agent, or Firm*—Bachman and LaPointe

[57] ABSTRACT

A method of reshaping magnetically relatively weak ferrite particles of substantially arbitrary shape into substantially spherically-shaped globules including the steps of transporting the particles by a carrier gas stream within a conduit into the vicinity of a stream of warm gases, separating the particles from the carrier gas stream prior to contact with said warm gas stream, feeding the separated particles into the stream of warm gases, melting the particles therein, and subsequently allowing the particles to solidify into substantially spherically-shaped globules.

10 Claims, No Drawings

METHOD OF MELTING MAGNETICALLY WEAK PARTICLES OF ARBITRARY SHAPE INTO SUBSTANTIALLY SPHERICALLY-SHAPED GLOBULES

BACKGROUND OF THE INVENTION

In various branches of industry, substantially spherically shaped ferrite particles having a diameter up to 200 micrometers are used. Certain properties of these particles, such as low magnetic remanence, mechanical rigidity, surface hardness, and, if possible, spherical shape and homogeneity are critical for the application of these particles. A known method which is used for the manufacture of magnetized particles having a spherical shape is the melting of these particles in a stream of hot gases, for example, plasma, so that the particles may subsequently solidify and assume a substantially spherical shape.

The methods used in the prior art are, however, disadvantageous for various reasons. If a gas stream is used having a low enthalpy per unit of mass, or having a low latent heat, or the required dwelling time of the particles in the gas stream is too long, the particles which melt and are liquefied collide on the surface of the gas stream, and agglomeration results. As a result the precipitation of spherically-shaped particles is relatively small, and a separate mechanism must be employed with the gas stream to separate the agglomerated and non-agglomerated particles. For the same reasons, namely a low heat conductivity of the gases, the particles are cooled relatively slowly, and as a result, magnetically relatively harder particles are obtained. In view of the slow heating and cooling process, oxidizable gases in the vicinity of the gas stream penetrate to the center of the gas stream, and at least a portion of the ferrite particles are oxidized into a non-magnetic iron oxide. In order to obviate the above-noted disadvantages, the devices and methods known in the prior art require the use of a dense and costly protective gas.

SUMMARY OF THE INVENTION

One of the principal objects of the present invention resides in a method of reshaping ferrite particles which are magnetically relatively weak and have substantially arbitrary shapes, particularly magnetite particles, into substantially spherically shaped globules. The steps in the method of the present invention include transporting the particles by means of a first carrier gas stream within a conduit into the vicinity of a second stream of warm gases having relatively hot and relatively cool regions. The particles in the first carrier gas stream are subjected to a centrifugal force so as to separate the particles from the first carrier gas stream prior to being fed into the second gas stream. The separated particles are then fed into the second gas stream, where they are melted by the relatively hot region of the second gas stream. The molten particles then pass into the relatively cool region of the second stream where the molten particles will solidify into substantially spherically-shaped globules. The solidified globules are then discharged from the second stream of warm gases.

It is preferred that the second stream is a plasma gas stream composed in its major part of steam, and that the method include the step of generating the plasma gas stream by means of a plasma generator.

It is preferred that the plasma generator is a direct current generator, and that the method include the step of generating the plasma gas stream in the direct current generator.

The method is preferably carried out in a reactor for the second stream, and the reactor is preferably disposed downstream of the plasma generator, and include the step of generating the plasma gas at an output energy of at least 50 kW in the reactor by means of the plasma generator.

The plasma generator is preferably fluid-stabilized, and includes the additional step of generating the plasma gas stream by means of the fluid-stabilized plasma generator.

It is alternately possible to generate the plasma gas stream so as to have an energy of at least 100 kW, or alternately 150 kW.

The first carrier gas stream advantageously includes an air gas stream, and includes the additional step of transporting the particles by means of the air gas stream.

The plasma generator preferably includes an iron anode, and includes the step of generating the plasma gas stream by means of a plasma generator having the iron anode.

It is preferable for the conduit to include at least two feed tubes arranged radially or axially, which are disposed in either a symmetrical and asymmetrical manner wherein the second stream has a predetermined direction of flow. The method includes the step of transporting the separated particles to the second gas stream by means of the feed tubes, feeding the separated particles into the second stream in a direction the vector of which has a component parallel to the predetermined direction of flow, and collecting the solidified particles.

DESCRIPTION OF THE PREFERRED EMBODIMENTS.

In accordance with the principles of the present invention, the particles which are to be melted and subsequently altered to solidify into substantially spherically-shaped globules are fed by means of a carrier gas within a tubular conduit or hose into the vicinity of a warm gas stream having an output of at least 50 kW, which is generated in a reactor by means of a plasma generator, the major portion of the warm gas stream consists of a stream. The major portion of the carrier gas stream is subjected to a centrifugal force just prior to leaving the conduit and entering the warm gas stream wherein the particles are separated from the powder or granular material. The particles are then fed into the warm gas stream, melted in hot zone of the warm gas stream, thereafter fed to and allowed to solidify in a relatively cool portion of the warm gas stream, thereafter collected and continuously discharged from the reactor.

Plasma generators, particularly direct current plasma generators, are utilized to generate the stream of warm gases. Fluid-stabilized plasma burners have been shown to be particularly suitable for carrying out the method of the present invention. Burners of this type are known, per se, and are described, for example, in U.S. Pat. No. 3,712,996, and U.S. Pat. 3,665,244. It is advantageous for the output of a plasma stream to exceed 100 kW, and preferably 150 kW.

Rotating copper discs are usually used as anodes for plasma generators of this type. Although such copper discs are also suitable for carrying out the method of the present invention, the use of rotating iron anodes has been shown to be particularly advantageous. Any iron particles which eroded from the anode are carried along in the plasma stream and are subsequently carried into the materials to be melted. It should be noted that the magnetic properties of the materials are changed only in an insignificant manner or not at all. It has been found, however, that if copper anodes are utilized, the magnetic properties of the material may become impaired.

The reactor adjacent to the plasma generator for carrying out the method of the present invention, should be provided with a fire-proof lining because of the high temperatures prevailing in its interior. It is therefore provided with openings, which serve, on one hand, for inserting the conduits carrying the granular material, and on the other hand, for discharging the final product in the form of spherically-shaped globules.

As a result of using steam as a major ingredient of the plasma gas, it has been surprisingly found, that the exact magnetic properties of melted ferrites and the subsequently solidified spherically-shaped globules, namely their magnetic softness and high saturation magnetization, are substantially improved in comparison to the use of other gases, such as carbon monoxide, which, from thermodynamic considerations are at least equally suitable for use in this method. Although the physical causes of these properties of the ferrites have not yet been fully explained, steam still occupies a unique and preferred position within the range of gases suitable for this application. In a few cases, the end product in the form of spherically-shaped globules of ferrite have properties and magnetic behavior superior to the behavior of the initial product. Such an improved behavior has never been observed in parallel experiments conducted with carbon monoxide plasma gases consisting of carbon monoxide with other additives.

The minimum required output power of the plasma stream, according to the present invention, insures a minimal dwelling time of the particles in an adequate hot zone of the warm gas stream, namely the required minimal output power primarily results in an adequate increase in the amount of plasma gas ejected per unit time, and therefore an adequate increase of its velocity. Due to this increased velocity of the plasma gas, the dwelling time of the particles required for the particles to be melted in the hot zone of the warm gas stream is reduced, due to an increase of the heat transfer from the gas to the particles by induction which results from the higher velocity difference of the particle- and gas-streams.

The uniform melting of the particles is thus insured. This uniform melting is also due to a lengthening and widening of the plasma gas stream as a result of its relatively high output, and consequently an enlargement of the gas stream volume having a temperature of approximately 2,000° C., which temperature is required for melting of the particles.

Due to the high velocity gradients of the gases in an axial direction within the stream, the median dwelling time of a particle is below that time interval which, if exceeded, increases the probability of a collision of the particles in their liquid state. As a result, there is not any significant increase in the number of relatively large particles, namely agglomerated particles, following melting and subsequent solidifying of the particles into substantially spherically-shaped globules when the method of the present invention is employed. The statistical distribution of the particle sizes following melting and solidifying of the particles therefore deviates only insignificantly from that of its initial distribution.

In order for the ferrite particles to have a sufficiently large discharge velocity from the transporting conduit to carry out the process of the invention, there is on the one hand a relatively large amount of carrier gas is needed, but, on the other hand, as far as possible, it is not desirable for the carrier gas or any part thereof pass into the plasma stream, as it could then cool the plasma stream and oxidize the ferrite particles. A high velocity of the carrier gas stream is additionally necessary, in order to insure a precise formation of the particle stream in the form of a collimated stream. This is achieved, according to the present invention, by the particle stream being separated from the carrier gas stream by being subjected to centrifugal forces prior to entering the hot gas stream. The collimated stream of particles is then discharged from the feed conduit at a velocity having a component in the direction of the plasma gas which is greater than zero. An arbitrary gas can be used as a carrier gas, the only condition being, for obvious reasons, that the carrier gas not corrode the apparatus or device used or the ferrite particles themselves.

In an advantageous development of the method of the present invention, there are provided two and preferably three carrier gas transport streams for the ferrite particles to be melted and are fed against the direction of gas stream in either a radially or axially symmetrical or asymmetrical arrangement.

The method according to the present invention is particularly suitable for melting naturally occurring highgrade magnetite and allowing the particles to subsequently solidify into substantially spherically-shaped globules maintaining their magnetic properties. Thus, it is no longer necessary to rely on synthetic magnetites in order to produce substantially spherically-shaped globules of magnetite having a diameter of up to 200 micrometers.

The method of the present invention will now be illustrated with the aid of two examples:

EXAMPLE 1

A water stabilized plasma generator, of the type described in U.S. Pat. Nos. 3,712,996, and 3,665,244, is operated at an output of 125 kilowatts. The current passing through the arc is 430 amperes at an arc voltage of 290 volts. At these operating parameters, the thermal efficiency of the generator is 58%, that means that the "plasma flame" emerging from the generator represents an output of 73 kilowatts. The plasma flow is 7 kilograms of $H_2O$ per hour. A rotating copper disc is used as an anode.

Magnetized powder supplied from two feed tubes is fed into this plasma flame at a rate of 20 kilograms per hour and feed tube. Air is used as a carrier gas at a rate of 28 $Nm^3$/per minute (normal cubic meters per minute). The feed tubes are curved at their respective ends, so that the vector of the emerging powder stream subtends an arc of 40° with the vector of the plasma flame. The ends of the feed tubes are formed with a slot of about 2 centimeters, so that the carrier air may escape prior to reaching the end of the respective tubes.

The properties of the powder prior to, and after the melting process, are shown in Table I, below.

TABLE I

| Property | Initial material | End product |
|---|---|---|
| Grain size | >85% 40–132 μm<br><10% below 40 μm<br><5% over 132 μm | >70% 40–132 μm<br><15% below 40 μm<br><15% over 132 μm |

TABLE I-continued

| Property | Initial material | End product |
|---|---|---|
| Composition | Fe >70% | >70% |
| | $Fe_3O_4$ 95±1% | 95±1% |
| | $Fe_2O_3$ 2,5±0,5% | 2,5 ±0.5% |
| | $SiO_2$ <0,5% | <0,5% |
| | $Al_2O_3$ <0,3% | <0,3% |
| Magnetization | | |
| At 7,000 Oe | 90 emu/g | 88 emu/g |
| At 1,000 Oe | 58 emu/g | 56 emu/g |
| Remanence | <2 emu/g | <2 emu/g |
| Coercive field | 18 Oe | 18 Oe |
| % of spherical particles | 0 | 90 |
| Pouring density | 2,0 | 2,6 g/cm³ |
| Specific surface | — | 450 cm²/g |
| Flow property according to ASTM B-212 bzw. B-213 | — | 1,6g/s |

As Table I shows, the properties of the magnetite are not significantly influenced by the process of melting the particles into substantially spherical particles. Particularly, the important magnetic properties and the chemical composition of the particles do not undergo any significant change.

EXAMPLE 2

A further experiment was conducted with the same plasma generator using the experimental parameters shown below:

TABLE II

| | |
|---|---|
| Electrical Generator Output | 250 kW |
| Arc current | 605 Ampere |
| Arc voltage | 410 volts |
| Thermal generator efficiency | 66% |
| Plasma stream output | 165 kW |
| Plasma quantity | 11 kg $H_2O$/h |
| Anode | Iron |
| Supply of magnetic powder | 88 kg/h |
| Carrier gas (air) | 0,4 Nm³/min |
| Angle subtended between material- and gas-streams | 50° |
| Length of slit at end of feed tube | 2,5 cm |

TABLE III

| Property | Initial material | End Product |
|---|---|---|
| Grain size | >85% 60–160 μm | >75% 60–160 μm |
| | <10% below 60 μm | <20% below 60 μm |
| | <5% over 160 μm | <5% over 160 μm |
| Magnetization | | |
| At 7,000 Oe | 85 emu/g | 88 emu/g |
| At 1,000 Oe | 54 emu/g | 56 emu/g |
| Remanence | <2,5 emu/g | <2,5 emu/g |
| Coercive field | 24 Oe | 24 Oe |
| % of spherical particles | 0 | 85% |
| Pouring density | <2,1 | 2,7 g/cm³ |
| Specific surface | — | 350 cm²/g |
| Flow property according to ASTM B-212 or B-213 | — | 2,2 g/s |

The properties of the material which has been melted and allowed to solidify into substantially spherical-shaped particles are shown in Table III.

Compared to Example 1, this experiment shows clearly the lower tendency for forming agglomerates during the formation of particles having substantially spherical-shape due to the greater output of the plasma stream.

Other properties of the magnetized particles which have been converted to substantially spherical-shaped particles do not show any significant change from the properties listed in Example 1, using a lower generator output, in spite of the higher generator output used in Example 2.

It is to be understood that the invention is not limited to the illustrations described and shown herein, which are deemed to merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A method for re-shaping relatively magnetically weak ferrite particles of arbitrary shapes so as to form substantially spherically-shaped globules comprising:
   (A) transporting said particles by means of a first carrier gas stream within a conduit;
   (B) separating said particles in said first carrier gas stream from said first carrier gas stream;
   (C) feeding said separated particles into a second warm gas stream having a relatively hot region and a relatively cool region;
   (D) melting said particles in said relatively hot region of said warm gas stream;
   (E) passing said melted particles to said cool region of said warm gas stream wherein said particles solidify into substantially spherically-shaped globules; and
   (F) discharging said solidified globules from said second warm gas stream.
2. The method of claim 1 wherein said warm gas stream is a plasma gas stream composed in its major part of steam, said plasma gas stream being generated by means of a plasma generator.
3. The method of claim 2 wherein said plasma generator is a direct current generator.
4. The method of claim 2 wherein said plasma gas stream has an output energy of at least 50 kW.
5. The method of claim 2 wherein said plasma generator is a fluid-stabilized generator.
6. The method of claim 2 wherein said plasma gas stream has an output energy of at least 100 kW.
7. The method of claim 2 wherein said plasma gas stream has an output energy of at least 150 kW.
8. The method of claim 1 wherein said carrier gas stream includes an air gas stream.
9. The method of claim 2 wherein said plasma generator includes an iron anode for generating said plasma gas stream.
10. The method of claim 1 wherein said conduit includes at least two feed tubes for transporting said separated particles to said warm gas stream wherein said particles are fed into said warm gas stream in a direction opposite to the flow direction of said warm gas stream.

* * * * *